United States Patent [19]

Musto et al.

[11] Patent Number: 4,574,089
[45] Date of Patent: Mar. 4, 1986

[54] PROCESS FOR PREPARING A LIQUID COFFEE AROMA

[75] Inventors: Joseph A. Musto, Bronx; Robert A. Scarella, Hawthorne, both of N.Y.; Harold W. Jacquett, Palisades, N.J.; Angelo V. Riolo, Parsippany, N.J.; Nicholas I. Della Fave, Ridgefield Park, N.J.

[73] Assignee: General Foods Corporation, White Plains, N.Y.

[21] Appl. No.: 726,756

[22] Filed: Apr. 24, 1985

[51] Int. Cl.⁴ ............................................. A23F 5/48
[52] U.S. Cl. .................................... 426/386; 426/594; 426/388; 426/474
[58] Field of Search ................ 426/386, 388, 594, 474

[56] References Cited

U.S. PATENT DOCUMENTS 2,156,212  4/1939  Wendt et al. .................. 426/386 X
3,769,032 10/1973  Lubsen et al. ................. 426/386 X
3,939,291  2/1976  Katz ................................. 426/594
3,979,528  9/1976  Mahlmann ........................ 426/594
4,007,291  2/1977  Siedlecki et al. ................. 426/594
4,119,736 10/1978  Howland et al. .................. 426/386
4,313,265  2/1982  Dwyer ............................... 426/388

Primary Examiner—Joseph Golian
Attorney, Agent, or Firm—Basam E. Nabulsi; Joseph T. Harcarik; Daniel J. Donovan

[57] ABSTRACT

A process for preparing a liquid aroma containing concentrated coffee aromatic compounds from a grinder gas frost is described. A higher yield of coffee aromatics is enabled, and these aromatics are of a higher quality. Further, the liquid aroma produced is essentially carbon dioxide free. The liquid aroma may be used to aromatize coffee powders, glycerides or other food substrates. Coffee powders aromatized with the liquid aroma are described as having a "buttery" "roasted and ground" coffee aroma.

14 Claims, No Drawings

PROCESS FOR PREPARING A LIQUID COFFEE AROMA

BACKGROUND OF THE INVENTION

The present invention relates to a process for preparing a liquid aroma containing concentrated coffee aromatic compounds from a grinder gas frost. The liquid aroma produced according to the invention may be used to aromatize a coffee substrate, such as a spray dried, freeze dried or roasted and ground coffee, or a glyceride, such as a coffee oil, or some other food material.

Soluble beverage powders such as spray dried coffee are relatively devoid of aroma as compared to their source or parent material, namely, roasted and ground coffee. Low aroma intensity also exists in certain types of roasted and ground coffee material such as most decaffeinated coffees and the compressed roasted coffee materials described in U.S. Pat. Nos. 1,903,362 to McKinnis, 3,615,667 to Joffee and 4,261,466 to Mahlmann et al. These low-aroma beverage powders and products have an initially low quantity of aroma, such that upon the initial opening of the container containing the product by the consumer, only low aroma impact is detected, and whatever amount of aroma is present in the product is rapidly given up after initial opening of the container, such that subsequent openings of the container during a typical in-use cycle for the product evolve little or no aroma.

To date most efforts to add natural aroma to soluble coffee products have focused on the addition of roasted coffee aroma to soluble coffees such as spray or freeze-dried coffee. The vast majority of commercial soluble coffees are combined with coffee oil such as by spraying the soluble coffee prior to packaging with either a pure or an aroma-enriched coffee oil. In this manner the soluble coffee material will have an aroma more akin to non-decaffeinated roasted and ground coffee. The addition of oil is usually effected by the well-known oil plating technique (shown in U.S. Pat. No. 3,077,405 to Clinton et al. and U.S. Pat. No. 3,148,070 to Mishkin et al.) or by oil injection (shown in U.S. Pat. No. 3,769,032 to Lubsen et al.).

Coffee oil with or without added aromas has been the preferred medium employed to aromatize coffee material since such products may still be designated as being pure coffee; however, techniques developed for the production of coffee oil such as solvent-extracting or expelling coffee oil from roasted coffee are not particularly desirable since the manufacturer is left with either solvent-containing roasted coffee or expelled cake, both of which must be either further processed or discarded. The prior art has certain other drawbacks including the poor flowability of plated coffee particles and the undesirable droplets of oil that can appear on the surface of a liquid beverage prepared from the plated coffee. To overcome the disadvantages and drawbacks of that use of coffee oil or other glyceride material, it is desired that an alternative medium be developed for aromatizing a coffee material.

Johnston and Patel et al. in U.S. Pat. Nos. 2,306,061 and 3,823,241 respectively, teach the aromatization of a beverage substance with coffee grinder gas by directly contacting grinder gas with a beverage substance which has been chilled to a temperature of at least −15° C. These references eliminate the use of coffee oil as an aromatization medium by enabling direct contact of grinder gas with the substrate to be aromatized. However, these methods are not commercially advantageous for several reasons, the primary reasons being that direct contact of grinder gas with a substrate is an inefficient means of mass transfer, that the hold-up time required for said contact is inefficient in a continuous coffee process, and that control of aromatization levels is impossible according to the cited methods.

The coffee art is replete with methods for aromatizing a glyceride with a grinder gas frost, said grinder has frost having been condensed by contact with a chilled medium. For example, U.S. Pat. No. 4,119,736 to Howland et al. discloses removal of a water phase from a pressure vessel containing condensed grinder gas at a pressure of in excess of 506.2 psia and a temperature of greater than 32° F., contacting the demoisturized grinder gas with a glyceride, and slowly venting the pressure vessel. Mahlmann in U.S. Pat. No. 3,979,528 discloses a method for aromatizing a glyceride by contacting it with a grinder gas frost in a pressure vessel at various conditions. Among the conditions disclosed by Mahlmann is a rapid pressure release of the pressure vessel to atmospheric pressure at a temperature below room temperature. However, in these references, as is true throughout the coffee art, substantial coffee aromas are lost to the atmosphere by venting rather than being fixed on a food substrate during an aromatization step.

Thus, it is an object of the present invention that an efficient means for aromatizing a substrate be found.

It is a further object that the aromatized substrate possess a coffee aroma comparable in quality to freshly ground roasted coffee.

It is another object that the yield of aromatized substrate per volume of coffee grinder gas be increased over prior art systems.

SUMMARY OF THE INVENTION

A process has now been discovered for concentrating a grinder gas frost by separating approximately 90% of its carbon dioxide content and 100% (or very nearly 100%) of its water and then further concentrating the water-free frost to obtain a liquid aroma containing concentrated coffee aromatic compounds. The liquid aroma produced by the process of the present invention may be used to aromatize a substrate, such as roasted and ground coffee, or by contacting the liquid aroma with a glyceride, such as coffee oil, and then contacting the glyceride with the substrate. The process of the invention is comprised of the steps of:

(a) condensing coffee grinder gas as a frost;

(b) placing the grinder gas frost in a pressure vessel;

(c) supplying heat to the contents of the vessel and allowing the frost to equilibrate at a pressure in excess of 750 psig, thereby forming three phases, a water phase, a liquid carbon dioxide phase containing a majority of the coffee aromatics, and a gaseous carbon dioxide phase;

(d) draining the water phase from the vessel;

(e) chilling a second vessel to a temperature of less than −80° F.;

(f) venting from below the liquid carbon dioxide surface in the first vessel through a line into the second vessel for a period sufficient to achieve pressure equilibration between the two vessels;

(g) isolating the first vessel from the second vessel (h) venting the second vessel so as to reach a pressure of 0 psig therein;

(i) warming the contents of the second vessel with the vessel sealed to a temperature of between about 0° F. and 30° F., so as to sublime any residual carbon dioxide contained therein to the gaseous phase; and (j) withdrawing a highly concentrated liquid coffee aroma from the second vessel which is essentially carbon dioxide free.

The concentrated coffee aroma phase, hereinafter liquid aroma, produced according to the present invention may be used to aromatize a coffee or other food substrate, or a glyceride such as coffee oil. It has been found that a higher yield and a better quality of coffee aromas are recovered by use of said concentrated liquid aroma than in prior art methods which typically employ a dilute grinder gas frost to aromatize a glyceride medium. Soluble coffee powders aromatized with the liquid aroma of this invention have been found to have a highly desirable "buttery", "roasted and ground" jar aroma by an expert panel. Additionally, a high yield of coffee aromas is achieved according to the present invention, as measured by the degree of coffee aroma recovery in the liquid aroma as compared to the initial grinder gas coffee aroma content. Finally, an extremely pure aroma stream is recovered which is substantially devoid of carbon dioxide.

DETAILED DESCRIPTION OF THE INVENTION

The present invention is directed to combining a liquid aroma containing grinder gas aromatics which have been concentrated and condensed from a grinder gas frost with coffee solids, a glyceride, or other food material. This invention is particularly described in terms of coffee grinder gas, which contains 80% to 90% by weight carbon dioxide; however, it is to be understood that other aroma-bearing gases which have a higher carbon dioxide content such as coffee percolator vent gas and coffee roaster gas, may likewise be employed and are considered to be within the scope of this invention.

The most readily available source of grinder gas may be obtained by enclosing or hooding coffee grinding equipment, such as commercial grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50° F. and where substantial quantities of water are removed. The relatively low-moisture gas is then fed to a second condenser, such as a jacketed, vertically-mounted, scraped-wall heat exchanger, which is cooled by means of a liquid gas refrigerant.

Preferably the second condenser is cooled by means of liquid nitrogen and the gas flow into the exchanger is maintained within the range of about 1 to 5 cubic feet per minute per square foot of heat exchanger surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. Typical grinder gas frost is collected at a liquid nitrogen jacket temperature of −195° F. to −220° F., contains approximately 87% carbon dioxide, approximately 10% water, and approximately 3% coffee aromas. The frost, as it is removed from the condenser wall and collected, is thus very dilute in the coffee aromas which are needed to overcome the relatively devoid aroma character of typical soluble beverage powders such as spray dried coffee. The frost may be held for a short period at low, such as liquid nitrogen, temperatures without deteriorating; however, it is preferred to immediately utilize the frost in accordance with this invention.

According to this invention, the grinder gas frost is placed in a pressure vessel. A sufficient amount of the grinder gas frost is added to avoid the presence of an unsaturated carbon dioxide vapor phase. Heat is added to the contents of the vessel, such as by means of a 70° F. to 85° F. water jacket, to sublime the grinder gas frost and form a headspace pressure. At approximately 75 psig solid carbon dioxide changes to liquid. The temperature corresponding to this phase change is −70° F. At this condition, water and any trace glyceride present, as well as some of the organic aromatics, are in the solid state. The temperature of the vessel contents is raised preferably to about room temperature, at which condition the grinder gas aromatics will diffuse and establish an equilibrium among the gaseous carbon dioxide, liquid carbon dioxide, and water phases. Although the formation of this liquid carbon dioxide phase is essential for retention of aromatics, an excess amount of liquid carbon dioxide results in longer processing times being required. Thus, in a preferred embodiment, the amount of liquid carbon dioxide formed is limited to the amount necessary to allow the coffee aromatics to solubilize therein. This amount may then be calculated based on the solubility of coffee aromatics in liquid carbon dioxide. After the frost within the vessel has reached the desired temperature, and possibly after an equilibrium period of up to several hours, a peak pressure is reached.

The vessel contents at this peak pressure may be in three distinct phases including a bottom water phase, a liquid carbon dioxide phase, and a gaseous carbon dioxide phase with aroma present in each phase. After the pressure within the vessel has reached its peak, generally at about 750 psig to about 950 psig, the water phase is removed from the vessel. This can be done by simply draining the water through a valve in the bottom of the vessel. In one embodiment of the invention, the temperature of the pressure vessel contents is increased to greater than 87.8° F., the critical temperature of carbon dioxide, thereby eliminating the presence of the liquid carbon dioxide phase. A complete water drain is thereby ensured because any likelihood that water may become entrained in the liquid carbon dioxide phase is eliminated. However, temperatures in excess of about 90° F. should be avoided to prevent undue degradation of the coffee aromas. Optionally, the removed water phase may be contacted with a glyceride, preferably coffee oil, in any apparatus that provides efficient liquid-liquid contact to recover aromatics contained therein.

After the water phase has been drained, the pressure vessel is maintained at a temperature of about 75° F. (23.9° C.) to about 85° F. (29.4° C.) and thereby at a pressure of about 750 psig to about 950 psig, for a period sufficient to ensure the existence of vapor-liquid equilibrium within the pressure vessel. After equilibrium has been established, and possibly after a holdup period of up to several hours, the pressure vessel is transferred from below the liquid carbon dioxide surface, preferably from the bottom of the pressure vessel, through a transfer line into a second pressure vessel. The second pressure vessel is pre-chilled, generally to a temperature of less than −80° F., and preferably to a temperature of less than −110° F. Said pre-chilling is generally accomplished by circulating a chilling medium, as for example liquid carbon dioxide or preferably liquid nitrogen, through the pressure vessel jacketing. The transferred liquid carbon dioxide enters the second pressure vessel through the transfer line.

The second pressure vessel is vented to the atmosphere with a back pressure of typically about 100 psig to about 200 psig as the liquid carbon dioxide phase enters its confines. As the liquid carbon dioxide enters the second pressure vessel, a fraction of the carbon dioxide flashes to the vapor phase. The latent heat required for the liquid-to-vapor phase change is supplied by the remaining liquid carbon dioxide stream which contains coffee aromatics, thereby resulting in a freezing of the liquid carbon dioxide plus aromatics to the solid phase. This freezing of the liquid carbon dioxide is further assisted by the chilled walls of the second pressure vessel. In an alternate embodiment of the invention, a series or battery of "first" pressure vessels may be loaded with grinder gas frost and simultaneously or sequentially transferred from the bottom into a single "second" pressure vessel. In this alternate embodiment, it is particularly important that the second vessel be sized such that formation of a liquid carbon dioxide phase is prevented during the second sublimation step, described hereinbelow.

The rate at which the liquid carbon dioxide phase is transferred to the second pressure vessel is controlled so as to prevent the transfer line from the first to the second pressure vessel from freezing and thereby restricting the flow. Said transfer line typically enters the second pressure vessel from the top and typically extends about ¼ to about ⅝ of the distance to the bottom of the vessel. A nozzle is typically affixed to the end of the transfer line, thereby atomizing the transferred liquid carbon dioxide phase as it passes therethrough. The diameter of the transfer line is selected so as to provide efficient transfer of the liquid carbon dioxide phase.

The transfer line is closed once pressure equilibration exists between the two vessels. Said pressure equilibration is typically at about 100 psig to about 200 psig, depending on the back pressure maintained on the second pressure vessel. It is preferred that the transfer line be closed immediately upon the completion of said equilibration in order to prevent relatively aroma-free gaseous carbon dioxide from entering the second pressure vessel. The completion of said transfer may be monitored by placing a site glass in the transfer line in addition to monitoring the rate of pressure change in either or both pressure vessels. The gaseous carbon dioxide which remains in the first pressure vessel after the transfer line is closed is typically discarded. The second pressure vessel is vented to a pressure of 0 psig and the vessel is then sealed.

The solid frost contained in the second pressure vessel is next heated, typically to about 0° F. to 30° F., thereby subliming all carbon dioxide contained therein and forming a predominantly two phase gas ($CO_2$)/liquid (aromatics) system in the sealed vessel. Any water which may be present in the system despite the earlier water drain will remain frozen as ice in this temperature range. Optionally, a second water drain may be accomplished by increasing the temperature of the liquid aroma to in excess of 32° F. (above 32° F. to 40° F.) thereby forming three phases: a water phase, a liquid carbon dioxide phase and a gaseous carbon dioxide phase, draining the water from the bottom of the second pressure vessel, and then chilling the liquid system back to about 0° F. to about 30° F. to again form a predominantly two phase gas/liquid system. Said two phase system is made up of coffee aromas in the liquid phase and carbon dioxide in the vapor phase. The liquid coffee aroma may then be collected from the pressure vessel and stored in a sealed container, generally at a temperature of less than −20° F., and preferably at less than about −110° F. or in an inert atmosphere. It is preferred that the gas/liquid system be maintained within the pressure vessel for a period of about 30 minutes to 2 hours prior to removing the liquid coffee aroma therefrom.

The liquid coffee aroma produced according to the invention is substantially carbon dioxide free. It is preferred that the liquid coffee aroma be entirely carbon dioxide free, i.e. 0% carbon dioxide. However, due to entrainment and other factors, small amounts of carbon dioxide, on the order of about 1% or less by weight, may be present in the liquid aroma. The total yield of said liquid aroma based on the initial grinder gas frost by weight is improved over prior art methods. The total yield of liquid aroma is, of course, dependent to some degree on the level of aromatics available in the grinder gas frost. That is, if the grinder gas frost is very dilute in coffee aromatics, a high yield of liquid aroma, typically measured as pounds liquid aroma recovered per 100 pounds grinder gas frost, would not be expected. Nonetheless, it is surprising according to the present invention that an improved yield of liquid aroma over prior art methods is possible while also producing a liquid aroma which is substantially carbon dioxide free.

The liquid aroma produced according to the invention may be used to aromatize a glyceride, a spray dried, freeze dried or agglomerated coffee substrate, roasted and ground coffee, a microporous particle such as is described in U.S. Pat. No. 4,389,422 to Hudak, or any food material which may become apparent to one skilled in the art. The aromatization of a glyceride, as for example coffee oil, may be accomplished by liquid-liquid contact in a batch or continuous system. The aromatized glyceride produced by contact with said liquid aroma may be used to aromatize a coffee powder or other food substrate, and has been found to give a "buttery" "Roasted & Ground" coffee aroma to the aromatized substrate.

The liquid aroma adsorbed onto a dry substrate in accordance with this invention has been found to be stable during prolonged storage under inert conditions such as that normally existing in packaged soluble coffee products. The sorbed liquid aroma has been found to produce desirable headspace aroma in containers and jars, typically described as "buttery" and "roasted and ground".

EXAMPLE 1

(A) A prechilled pressure vessel was loaded with 150 lbs. of grinder gas frost and the pressure vessel was heated to 70° F. After the equilibrium pressure of 850 psig was reached, the pressure vessel was held for one hour. Three phases were formed inside the vessel: gaseous $CO_2$, liquid $CO_2$ containing a majority of the coffee aromatics, and liquid $H_2O$.

The water phase was drained and the pressure vessel was connected to a second pressure vessel prechilled to −110° F. The second pressure vessel was used as the collecting vessel for the concentrated water-free frost as the contents of the first pressure vessel were transferred through a transfer line located at the bottom of the first vessel.

The second pressure vessel was allowed to vent to the atmosphere with a back pressure of 200 psig until pressure equilibration was achieved between the two vessels, all the while maintaining the second pressure vessel at −100° F. Once pressure equilibration was achieved, the transfer line was closed. The remaining contents of the first pressure vessel were discarded. After the pressure in the second vessel dropped to 0 psig, the vent line was closed.

A solid frost highly concentrated in coffee aromatics was now contained in the second pressure vessel. The temperature of said second vessel was raised to 15° F. and the solid frost was thereby converted to a liquid aroma and a gaseous carbon dioxide headspace. The vessel was held at 15° F. for 1 hour.

The liquid aroma was then collected from the vessel and stored in a sealed container at −110° F. Analysis by GC demonstrated the liquid aroma to contain no carbon dioxide, and showed the liquid aroma to be very rich in coffee aromatics, measuring $3.5 \times 10^6$ total G.C. counts.

EXAMPLE 2

A control liquid aroma was produced according to the following process:

A prechilled 1 l. Hoke bomb was loaded with 500 g. of grinder gas frost and the bomb was placed in a 70° F. water bath. After the equilibrium pressure of 840 psig was reached the bomb was held for one hour. Three phases were formed inside the vessel: gaseous $CO_2$, liquid $CO_2$ and liquid $H_2O$.

The water phase was drained and the 1 l. Hoke bomb was connected to a 2 l. Parr bomb prechilled to −110° F. and maintained in dry ice. The Parr bomb was used as the collecting vessel for the concentrated water-free frost as the Hoke bomb was vented through the bottom opening.

The 2 l. Parr bomb was vented to the atmosphere while maintaining a back pressure of about 80–200 psig. When the pressure in the Hoke bomb dropped to 375 psig, the line connecting the Hoke bomb to the Parr bomb was sealed, thereby isolating one from the other. The gaseous phase then remaining in the Hoke bomb was discarded.

A solid frost concentrated in coffee aromatics was now contained in the Parr bomb. It constituted approximately 20% of the initial grinder gas frost by weight (i.e., about 100 g.). The temperature of the Parr bomb was raised to 0° F. and the solid frost was thereby converted to a liquid aroma. The Parr bomb was held at 0° F. for 7 hours and all gaseous carbon dioxide released from the effervescent liquid aroma was maintained as a headspace within the Parr bomb. The liquid was then collected from the Parr bomb.

A comparison of the physical and chemical properties of this Control liquid aroma and the liquid aroma of Example 1, both produced from the same grinder gas frost, is given in the following Table.

TABLE

| | Control Liquid Aroma | Example 1 Liquid Aroma |
|---|---|---|
| Yield (g Liq. Aroma/100 g Grinder Gas Frost) | 1.0 | 2.3 |
| Total G.C. Counts | $3.16 \times 10^6$ | $3.47 \times 10^6$ |
| $CO_2$ Content (By Weight) | 1.8% | 0% |

A review of the above data demonstrates the improved efficiency of the liquid aroma process of the present invention, particularly as evidenced by the increased yield of coffee aromatics on a weight basis, the improved quality as evidenced by the increased G.C. counts, and improved purity as shown by the total absence of carbon dioxide.

We claim:
1. A process for preparing a liquid coffee aroma comprising the steps of:
   (a) condensing coffee grinder gas as a frost;
   (b) placing the grinder gas frost in a pressure vessel;
   (c) supplying heat to the contents of the vessel and allowing the frost to equilibrate at a pressure in excess of 750 psig, thereby forming three phases, a water phase, a liquid carbon dioxide phase, and a gaseous carbon dioxide phase;
   (d) draining the water phase from the vessel;
   (e) chilling a second vessel to a temperature of less than −80° F.;
   (f) venting from below the liquid carbon dioxide surface in the first vessel through a line into the second vessel for a period sufficient to achieve pressure equilibration between the two vessels;
   (g) isolating the second pressure vessel from the first;
   (h) venting the second vessel so as to reach a pressure of 0 psig in the vessel;
   (i) warming the contents of the second vessel with the vessel sealed to a temperature of between about 0° F. and 30° F., so as to sublime all residual carbon dioxide contained therein to the gaseous phase; and
   (j) withdrawing a highly concentrated liquid coffee aroma from the second vessel which is essentially carbon dioxide free.

2. The process of claim 1 wherein the second vessel of step (e) is chilled to less than about −110° F.

3. The process of claim 1 wherein the venting of step (f) occurs from the bottom of the first vessel.

4. The process of claim 1 wherein the second vessel is allowed to vent to the atmosphere in step (f) with a back pressure of about 100 psig to about 200 psig.

5. The process of claim 1 wherein the second vessel is maintained at less than about −110° F. throughout steps (f), (g) and (h).

6. The process of claim 1 wherein a nozzle is affixed to the end of the line of step (f) within the second vessel.

7. The process of claim 1 further comprising warming the contents of the second pressure vessel of step (i) to above 32° F. to 40° F. thereby forming three phases, a water phase, a liquid carbon dioxide phase, and a gaseous carbon dioxide phase; draining the water phase; and chilling the vessel to between about 0° F. to about 30° F.

8. The process of claim 1 wherein the sublimation of step (i) is conducted for a period of about 30 minutes to two hours.

9. The process of claim 1 further comprising contacting the liquid aroma with a food substrate.

10. The process of claim 1 wherein said substrate is a coffee powder.

11. The process of claim 10 wherein said coffee powder is microporous.

12. The process of claim 9 wherein said substrate is a glyceride.

13. The process of claim 12 wherein said glyceride is coffee oil.

14. The process of claim 9 wherein said substrate is roasted and ground coffee.

* * * * *